(12) United States Patent
Kakumoto

(10) Patent No.: US 12,523,986 B2
(45) Date of Patent: Jan. 13, 2026

(54) CONTROL METHOD OF SUPERIMPOSITION PROCESSING OF NC MACHINE TOOL

(71) Applicant: NAKAMURA-TOME PRECISION INDUSTRY CO., LTD., Hakusan (JP)

(72) Inventor: Masahiko Kakumoto, Hakusan (JP)

(73) Assignee: NAKAMURA-TOME PRECISION INDUSTRY CO., LTD., Hakusan (JP)

( * ) Notice: Subject to any disclaimer, the term of this patent is extended or adjusted under 35 U.S.C. 154(b) by 387 days.

(21) Appl. No.: 18/141,799

(22) Filed: May 1, 2023

(65) Prior Publication Data

US 2023/0266744 A1     Aug. 24, 2023

Related U.S. Application Data

(63) Continuation of application No. PCT/JP2021/033689, filed on Sep. 14, 2021.

(30) Foreign Application Priority Data

Nov. 10, 2020  (JP) .................. 2020-187036

(51) Int. Cl.
*G05B 19/4155* (2006.01)
*B23Q 15/12* (2006.01)

(52) U.S. Cl.
CPC ......... *G05B 19/4155* (2013.01); *B23Q 15/12* (2013.01); *G05B 2219/35519* (2013.01)

(58) Field of Classification Search
None
See application file for complete search history.

(56) References Cited

U.S. PATENT DOCUMENTS 6,971,294 B1     12/2005   Shinohara et al.
2021/0311460 A1  10/2021   Sagasaki et al.

FOREIGN PATENT DOCUMENTS

| EP | 1319999 A1 | 6/2003 |
| JP | H01-150909 A | 6/1989 |
| WO | 01/66289 A1 | 9/2001 |
| WO | 2020/084770 A1 | 4/2020 |

OTHER PUBLICATIONS

Machine Translation of JP H01-150909 (Year: 1989).*
Nov. 22, 2021 International Search Report issued in International Patent Application No. PCT/JP2021/033689.
May 29, 2024 Extended European Search Report issued in European Patent Application No. 21891485.1.

* cited by examiner

*Primary Examiner* — Ryan A Jarrett
(74) *Attorney, Agent, or Firm* — Oliff PLC

(57) ABSTRACT

A control method of superimposition processing in an NC machine tool comprises providing at least one tool rest that performs machine processing to workpieces respectively held on a plurality of spindles, providing respective processing programs for performing respective machine processing to the workpieces held on the respective spindles, and inserting superimposition control program for performing superimposition processing during one of the respective processing programs is running. The superimposition processing is performed so that, during an operation of performing machine processing to a workpiece held on one of the plurality of spindles by one of the plurality of tools, the other operation of performing machine processing to a workpiece held on another one of the plurality of spindles by another one of the plurality of tools is superimposed.

3 Claims, 5 Drawing Sheets

FIG. 4

| UPPER | HEAD-2 |
|---|---|
| L-SP | R-SP |
| N10 M41 (O.D. ROUGH L) (SP-CTRL) | N20 M441 (O.D. ROUGH R) (SP-CTRL) |
| G54 | G55 |
| G18 | G18 |
| G28U0V0 | G28 U0 V0 |
| G50S2000 | G50 S2000 |
| G0G40G96G99T0101M3S160 | G0 G40 G96 G99 T4141 M54 S160 |
| M8 | M8 |
| (APPROACH) | (APPROACH) |
| G458 X104. Z2. | G458 X64. Z-2. |
| G0 Z2. | G0 Z-2 |
| G0X104.0 | G0 X64.0 |
| : | : |
| (PROCESSING PATH) | (PROCESSING PATH) |
| : | : |
| G0G40X104.0Z2.0(ESCAPE) | G0G40X104.0Z2.0(ESCAPE) |
| G459 | G459 |
| M9 | M9 |
| G28U0V0 | G28U0V0 |
| M1 | M1 |

CONTROL METHOD OF SUPERIMPOSITION PROCESSING OF NC MACHINE TOOL

CROSS REFERENCE TO RELATED APPLICATIONS

This application is a continuation of International Patent Application No. PCT/JP2021/033689, having an international filing date of Sep. 14, 2021, which designated the United States, the entirety of which is incorporated herein by reference. Japanese Patent Application No. 2020-187036 filed on Nov. 10, 2020 is also incorporated herein by reference in its entirety.

BACKGROUND OF THE INVENTION

The present disclosure relates to a control method for simultaneously performing the same or different machine processing onto a plurality of workpieces.

For example, in the field of machine tools such as NC control lathes, a machine tool is known from, for example, International Publication No. WO 01/066289 or the like, which can perform superimposition processing by using a tool rest having two tools, onto a workpiece grasped by a first spindle, and a workpiece grasped by a second spindle.

However, there is a technical problem as follows when performing superimposition processing onto a plurality of workpieces by one tool rest having a plurality of tools.

Firstly, workability is poor, because an operator needs to program at each time so that the positional relationship between each of the plurality of tools of the tool rest and each of workpieces can be set, and start and end positions of the superimposition processing can be optimized.

Secondly, it is necessary to obtain geometry values (a correction amount due to the shape of the cutting edge and a correction amount due to wear of the cutting edge) of each of the cutting edges of the plurality of tools, but since a plurality of patterns are assumed, it is necessary to make settings according to the plurality of patterns.

This is described with FIG. 5.

FIG. 5 is an example in which an L spindle 10 and an R spindle 20 that is disposed to face the L spindle 10 are disposed, and for example, in the case of having a tool rest 30 that has a first tool 31 and a second tool 32. As the pattern of obtaining geometry values between a cutting edge of the second tool and the R spindle 20, there are the case of obtaining the geometry values of the cutting edge in the state in which the R spindle 20 based on the tool rest 30 located at a retracted position as illustrated in FIG. 5A, in which the second tool 32 is located on an R spindle side at a superimposition processing start time as illustrated in FIG. 5B, and in which the first tool 31 is located on an L spindle side as illustrated in FIG. 5C. Accordingly, it is necessary to consider insertion positions of ON/OFF programs of the superimposition control mode at the time of programming, and the work of the operator is difficult.

BRIEF DESCRIPTION OF THE DRAWINGS

FIG. 4 illustrates an example of insertion of superimposition G codes.

DETAILED DESCRIPTION

Figure 1:
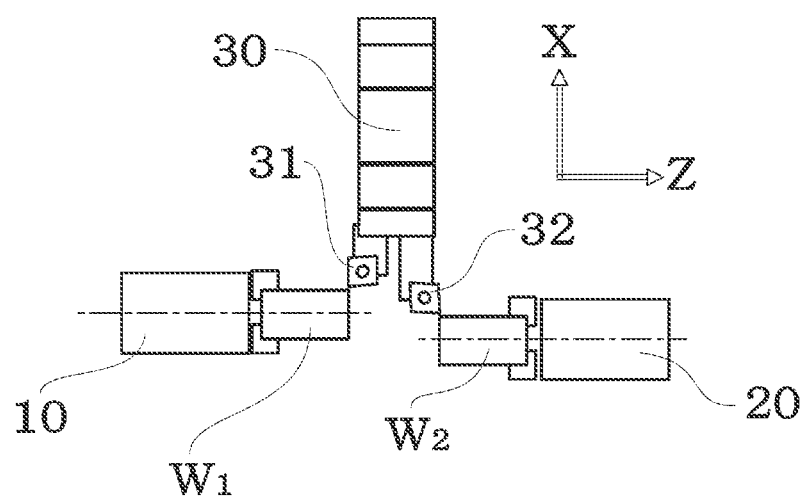
FIG. 1 illustrates an example of superimposition processing using control program of superimposition processing according to the present disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between It is an object of the present disclosure to provide a control method of superimposition processing in an NC machine tool that facilitates ON/OFF operations of insertion of a superimposition control mode and can automatically set geometry.

In accordance with one of some aspect, there is provided a control method of superimposition processing of an NC machine tool, comprising: providing at least one tool rest that includes a plurality of tools for performing machine processing to workpieces respectively held on a plurality of spindles; providing respective processing programs for performing respective kinds of machine processing by the at least one tool rest to the workpieces held on the respective spindles; and inserting superimposition control program for at least partially performing the superimposition processing during one of the respective processing programs is running.

Here, the superimposition processing means that one tool rest includes a plurality of tools, and on an operation of performing machine processing of a certain workpiece by one of the plurality of tools, a processing operation of another workpiece by another one of the plurality of tools is superimposed.

The present disclosure has a feature in that two processes to be subjected to superimposition control are selected, and a superimposition control mode can be inserted in or released from those two processes, by using a process editing function of programing an NC control program of processing for performing machine processing of a workpiece held by each spindle of each tool of the above-referenced plurality of tools.

Accordingly, the control method of superimposition processing according to the present disclosure can be applied to NC machine tools such as various multitasking machines, if only each of the machine tools has a plurality of spindles and at least one tool rest.

For example, there is cited an example in which the plurality of spindles includes an L spindle and an R spindle that are disposed to face each other, a first workpiece is held on the L spindle, and a second workpiece is held on the R spindle, the tool rest has a first tool and a second tool, a first processing program for machine-processing the first workpiece by the first tool is provided, and a second processing program for machine-processing the second workpiece by the second tool is provided, and superimposition control program for superimposition processing is insertable and releasable during one of the first and second processing programs is running.

Further, in the present disclosure, it is also possible to include geometry value setting program that automatically calculates and automatically sets a geometry value of a cutting edge position of a slave side tool based on a cutting edge position of a master side tool when the superimposition control mode of performing the superimposition processing is turned on, by utilizing a setting function of geometry included in each of existing processing programs.

In the control method of superimposition processing of an NC machine tool according to the present disclosure, processes in one processing program and the other processing program that are to be subjected to superimposition control are selected, and the superimposition control program is inserted, whereby internal conversion of the coordinate system for performing superimposition control, and setting of a G code (preparation function), an M code (auxiliary function), and a T code (tool code) are executed, and a workload on the operator is reduced.

Further, it is also possible to automatically calculate and automatically set geometry of the cutting edge position on the slave side based on the cutting edge position on the master side in the superimposition control mode by utilizing the existing geometry calculation function and setting function included in each of the processing programs.

Exemplary embodiments are described below. Note that the following exemplary embodiments do not in any way limit the scope of the content defined by the claims laid out herein. Note also that all of the elements described in the present embodiment should not necessarily be taken as essential elements As an example of an NC machine tool according to the present disclosure, an example that has an R spindle 20 disposed to face an L spindle 10, and a tool rest 30 including a turret, and the tool rest has a first tool 31 and a second tool 32 will be described hereinafter.

The present disclosure is also applied to a machine tool that has more than two spindles and more than at least one tool rest, as long as it has two or more spindles and at least one tool rest.

The L spindle 10 is fixed, and the R spindle 20 is controlled to move at least in a Z-axis direction and an X-axis direction.

The example illustrated in FIG. 1 illustrates an example in which lathe-turning bites are attached to a turret respectively as the first and the second tools, but the tools are not limited.

The tool rest 30 is also controlled to move at least in the Z-axis direction and the X-axis direction.

Note that movement control means in a Y-axis direction may be included as necessary.

Further, the example illustrated in FIG. 1 is an example in which a process of turning and cutting a second workpiece $W_2$ that is chuck-held on the R spindle 20 with rotation controlled is superimposed on a process of cutting a first workpiece $W_1$ that is chuck-held on the L spindle 10 with rotation controlled, by the first tool 31, but a combination of superimposition processing is not limited.

In this case, while in the first tool 31, a cutting amount in the X-axis direction, and a feeding amount in the Z-axis direction are controlled with respect to the first workpiece $W_1$, the second tool 32 also moves together with the first tool 31, and therefore, while following this moving amount of the first tool 31, a cutting amount and a feeding amount of the second workpiece $W_2$ that is turned and cut by the second tool 32 are further superimposed on the R spindle 20.

Next, an example of inserting a G code for superimposition control to perform the above-referenced superimposition processing will be described.

Figure 2A:
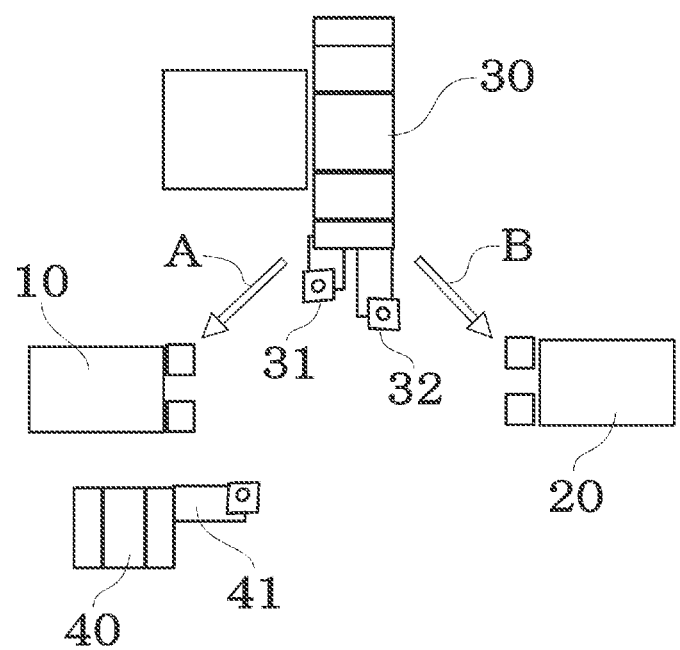
FIG. 2A illustrates individual processing modes.
Figure 2B:
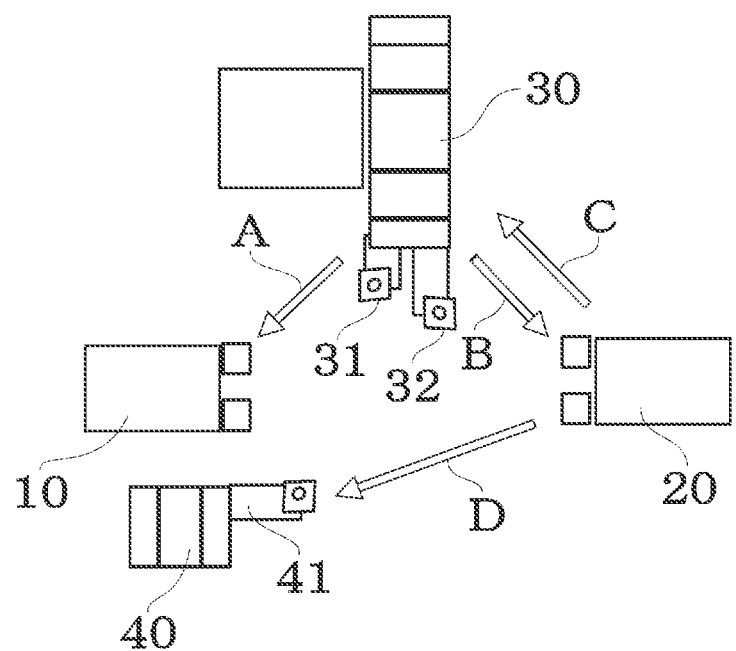
FIG. 2B illustrates an example of superimposition or cooperation processing.

FIG. 2A illustrates an example of movement of each individual processing, and FIG. 2B schematically illustrates an example of superimposition processing or cooperation processing.

As existing process editing functions, a program A of a process of performing processing to the first workpiece held on the L spindle 10 by the first tool 31 attached to the tool rest 30, and a program B of a process of performing processing to the second workpiece held on the R spindle 20 by the second tool 32 are respectively stored.

In relation to the above, in the present disclosure, it is possible to edit a program C in which the machine processing to the second workpiece on the R spindle 20 by the second tool 32 is superimposed on a part of the process of processing in the program A as illustrated in FIG. 213.

Further, it is also possible to edit a program D that performs machine processing to the second workpiece on the R spindle 20 by a third tool 41 that is attached to a second tool rest 40 in cooperation with the program A.

Figure 3:
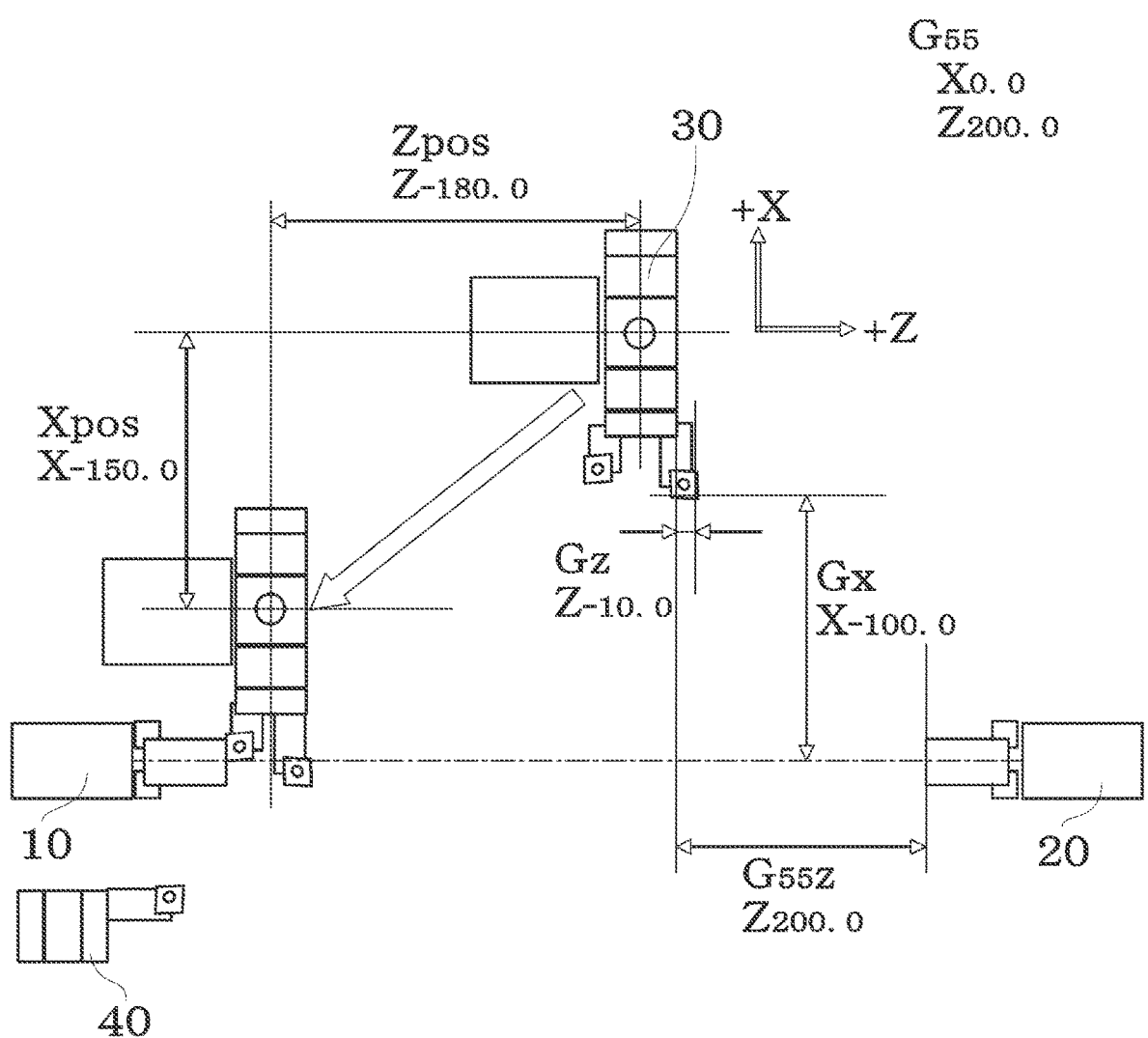
FIG. 3 illustrates an automatic calculation example of a coordinate system in a superimposition control mode.
Figure 5A:
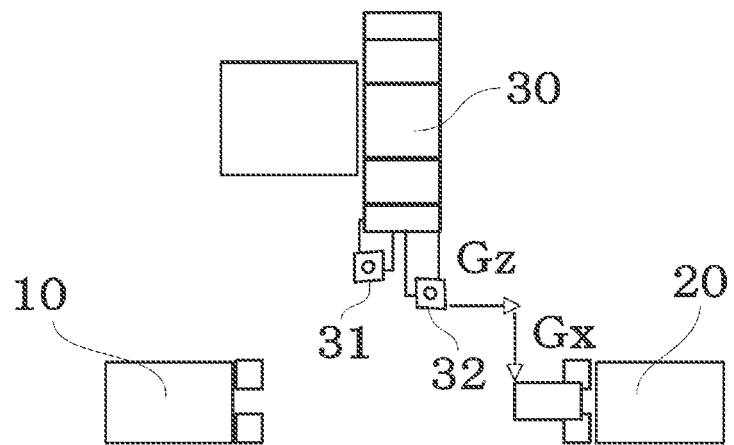
FIGS. 5A, 5B, and SC illustrate examples of a conventional geometry calculation.
Figure 5B:
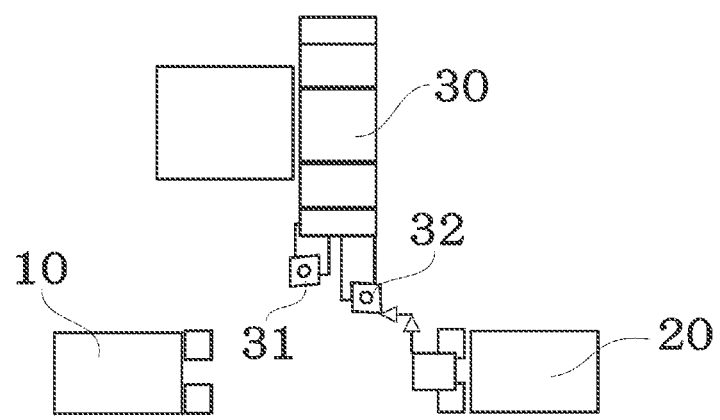
Figure 5C:
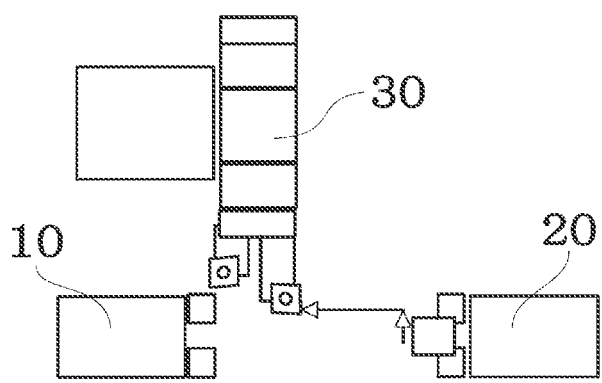

As an method for executing the program, a process of superimposition of the R spindle side in a process chart of the program A is selected, a process of superimposition of the L spindle side in a process chart of the program B is selected, and execution of a superimposition process is pressed, whereby a coordinate system is automatically calculated as illustrated in FIG. 3, and cycle G codes for executing superimposition control are inserted as illustrated in FIG. 4.

At this time, internal parameters required for execution are automatically converted.

Specifically, an automatic calculation example of the coordinate system in the superimposition control mode is illustrated in FIG. 3.

FIG. 3 is an example of a case in which a coordinate system G55 is set, a superimposition mode start point ON is automatically calculated as X-150.0, and Z-180.0, with respect to an origin of X 0.0, and Z 200.0, and internal coordinates are converted.

As an example, FIG. 4 illustrates an example in which the G codes for the superimposition control mode are inserted.

UPPER/L-SP on a left side indicates a process example between the tool rest 30 and the L spindle 10, and HEAD-2/R-SP on a right side indicates a process example between the tool rest 30 and the R spindle 20.

When the superimposition process is executed, G458 is inserted as a G code directly under (APPROACH) on each of the L-SP and R-SP sides, each of coordinates of approaches is automatically obtained, and an argument X/Z is determined.

"SP-CTRL" illustrated in FIG. 4 means superimposition control (Superimposed).

Further, in the example, G459 is inserted directly under (ESCAPE) in each of L-SP and R-SP, as an OFF command of end of the superimposition control mode.

Further, in order to release the superimposition process, it is possible to release the superimposition process by positioning a cursor on the process of the L spindle or the R spindle, thereafter, pressing [Superimposition settings], and executing [Release superimposition process?].

Since the control method of superimposition processing according to the present disclosure is realized by selecting processes in both the processing programs to be subjected to superimposition control, and inserting the superimposition control program, workload on an operator is reduced, and the control method can be applied to a large number of machine tools.

Although only some embodiments of the present disclosure have been described in detail above, those skilled in the art will readily appreciate that many modifications are possible in the embodiments without materially departing from the novel teachings and advantages of the present disclosure. Accordingly, all such modifications are intended to be included within scope of the present disclosure.

The invention claimed is:

1. A control method of superimposition processing of an NC machine tool, comprising:
   providing at least one tool rest that includes a plurality of tools for performing machine processing to a first workpiece and a second workpiece respectively held on an L spindle and an R spindle that are disposed to face each other, wherein one tool rest in the at least one tool rest is controlled to move at least in a Z-axis direction and an X-axis direction, and includes a first tool as a master-side tool and a second tool as a slave side tool, and the one tool rest is controlled to move at least in a Z-axis direction and an X-axis direction, and the L spindle is fixed in the Z-axis and the X-axis directions, and the R spindle is controlled to move at least in the Z-axis and the X-axis directions;
   providing respective processing programs for performing respective kinds of machine processing by the one tool rest to the first workpiece held on the L spindle or the second workpiece held on the R spindle wherein the processing programs includes a first processing program for machine-processing the first workpiece by the first tool, and a second processing program for machine-processing the second workpiece by the second tool; and
   inserting superimposition control program for at least partially performing the superimposition processing in which the second processing program runs while the first processing program is running into the first and second processing programs.

2. The control method of superimposition processing of an NC machine tool according to claim 1, wherein
   the superimposition processing is performed so that the R spindle is controlled to move by a cutting amount of the slave side tool in the X-axis direction and a feeding amount of the slave side tool in the Z-axis direction while following a movement of the master-side tool in the X-axis and the Z-axis directions.

3. The control method of superimposition processing of an NC machine tool according to claim 2, wherein
   a geometry value of cutting edge position of the slave-side tool is automatically calculated based on cutting edge position of the master-side tool and
   the geometry value is automatically set in the superimposition processing.

* * * * *